United States Patent
Nagamine et al.

(10) Patent No.: US 11,208,094 B2
(45) Date of Patent: Dec. 28, 2021

(54) METHOD AND DEVICE FOR CONTROLLING HYBRID VEHICLE

(71) Applicant: NISSAN MOTOR CO., LTD., Yokohama (JP)

(72) Inventors: Morihiro Nagamine, Kanagawa (JP); Hiromu Terai, Kanagawa (JP); Takeshi Watanabe, Kanagawa (JP); Atsushi Teraji, Kanagawa (JP); Hiroyuki Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/755,492

(22) PCT Filed: Oct. 12, 2017

(86) PCT No.: PCT/JP2017/036901
§ 371 (c)(1),
(2) Date: Apr. 10, 2020

(87) PCT Pub. No.: WO2019/073561
PCT Pub. Date: Apr. 18, 2019

(65) Prior Publication Data
US 2020/0398818 A1 Dec. 24, 2020

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *F02D 41/307* (2013.01)

(58) Field of Classification Search
CPC ................. B60W 10/06; B60W 10/08; B60W 2710/0622; B60W 2710/0627;
(Continued)

(56) References Cited

U.S. PATENT DOCUMENTS

| 6,367,570 B1* | 4/2002 | Long, III | B60K 6/485 |
| | | | 180/65.26 |
| 6,390,214 B1* | 5/2002 | Takahashi | B60W 20/20 |
| | | | 180/65.26 |

(Continued)

FOREIGN PATENT DOCUMENTS

| JP | 2001-082210 A | | 3/2001 |
| JP | 2001082210 A | * | 3/2001 |

(Continued)

*Primary Examiner* — Sizo B Vilakazi
*Assistant Examiner* — Brian R Kirby
(74) *Attorney, Agent, or Firm* — Faegre Drinker Biddle & Reath LLP

(57) ABSTRACT

A hybrid vehicle has an engine (E) that is capable of changing a combustion mode between a stoichiometric combustion mode and a lean combustion mode and a motor/generator (MG) that is capable of performing torque assist by a power running operation and torque absorption by a regenerative operation. As a boundary between a stoichiometric combustion operating region and a lean combustion operating region, a second boundary (L2) at a torque decrease has a hysteresis at a low torque side with respect to a first boundary (L1) at a torque increase. Upon shift from the stoichiometric combustion operating region to the lean combustion operating region, for delay in increase of an intake-air quantity, decrease in fuel and the torque assist by the motor/generator (MG) are carried out, and an exhaust air-fuel ratio is changed stepwise.

4 Claims, 6 Drawing Sheets

(51) Int. Cl.
   *B60W 10/08* (2006.01)
   *F02D 41/30* (2006.01)
(58) Field of Classification Search
   CPC . B60W 2710/0633; B60W 2050/0026; B60W
   2510/244; B60W 2710/083; B60W 20/10;
   F02D 41/307; F02D 41/34; F02D
   2041/1431; F02D 41/1401; F02D
   41/1475; F02D 41/1454; F02D 2250/21;
   F02D 41/3029; Y02T 10/70; Y02T 10/40;
   Y02T 10/62; F02P 5/1521; B60K 6/547;
   B60K 6/387; B60K 2006/4825; B60K
   6/48
   USPC ........................................... 701/22, 102–105
   See application file for complete search history.

(56) References Cited

U.S. PATENT DOCUMENTS

| | | | | |
|---|---|---|---|---|
| 6,428,444 | B1* | 8/2002 | Tabata | B60K 6/52 477/3 |
| 2003/0102175 | A1* | 6/2003 | Wakashiro | F02D 41/221 180/65.26 |
| 2003/0107335 | A1* | 6/2003 | Kitajima | B60K 6/485 318/34 |
| 2008/0000700 | A1* | 1/2008 | Kotani | B60W 20/00 180/65.265 |
| 2010/0162686 | A1 | 7/2010 | Miyashita et al. | |
| 2015/0377164 | A1* | 12/2015 | Kanno | H02P 9/02 290/40 R |
| 2016/0003175 | A1* | 1/2016 | Saito | F02D 41/0007 60/603 |
| 2016/0107636 | A1* | 4/2016 | Morita | B60W 20/16 701/22 |
| 2017/0298856 | A1* | 10/2017 | Suzuki | F02D 41/3029 |

FOREIGN PATENT DOCUMENTS

| | | |
|---|---|---|
| JP | 2005-069029 A | 3/2005 |
| JP | 2008-068802 A | 3/2008 |
| JP | 2016-011639 A | 1/2016 |

\* cited by examiner

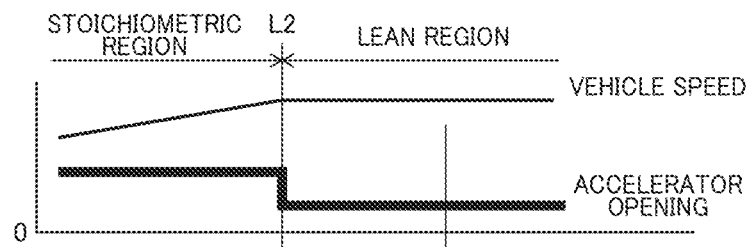
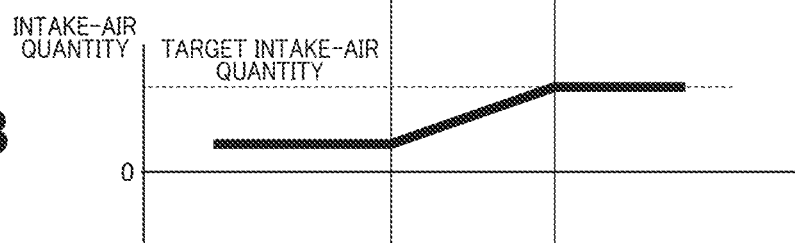
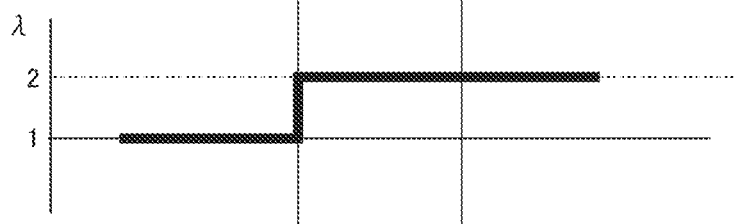
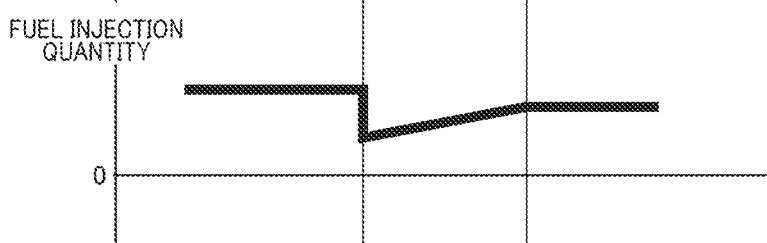
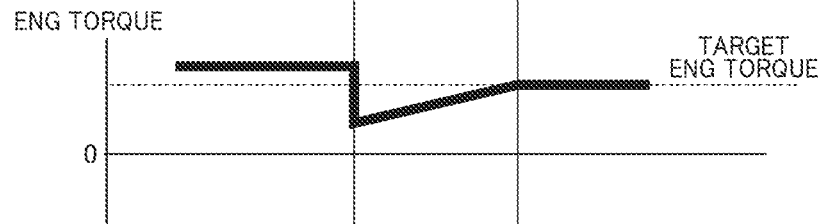
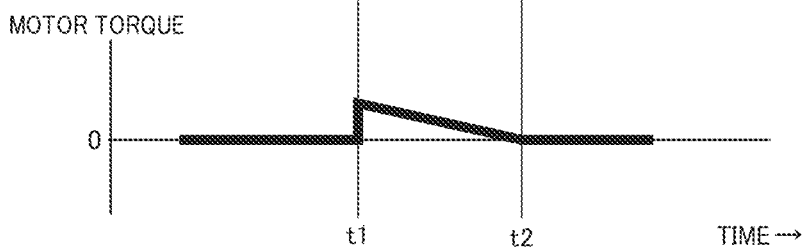

METHOD AND DEVICE FOR CONTROLLING HYBRID VEHICLE

The present invention relates to a method and a device for controlling a hybrid vehicle having an internal combustion engine and a motor as driving sources, particularly a hybrid vehicle using an internal combustion engine that is capable of changing a combustion mode between a stoichiometric combustion mode in which a stoichiometric air-fuel ratio is set as a target air-fuel ratio and a lean combustion mode in which a lean air-fuel ratio is set as the target air-fuel ratio.

BACKGROUND ART

There is known an internal combustion engine that is capable of changing a combustion mode between a stoichiometric combustion mode in which a stoichiometric air-fuel ratio is set as a target air-fuel ratio and a lean combustion mode in which a lean air-fuel ratio is set as the target air-fuel ratio for improving fuel efficiency. For such an internal combustion engine, in terms of improvement in the fuel efficiency, it is desirable that the lean combustion mode be set in a wider range of an engine operating condition (torque and engine rotation speed).

On the other hand, from the viewpoint of purification of exhaust gas of the internal combustion engine which is treated using a catalytic device etc., it is not preferable that an intermediate exhaust air-fuel ratio occur at the change of the combustion mode between the both stoichiometric and lean combustion modes at which the target air-fuel ratio is changed. That is, it is preferable for the exhaust air-fuel ratio to change stepwise along each target air-fuel ratio at the change of the combustion mode between the stoichiometric combustion mode and the lean combustion mode.

However, a quantity of an intake air required for the combustion is different between the stoichiometric combustion mode and the lean combustion mode. Therefore, for instance, a throttle valve opening is changed according to the change of the combustion mode. However, even if the throttle valve opening is changed stepwise, in actual fact, delay in a change of the quantity of the intake air that flows into a combustion chamber occurs. Because of this, an actual intake-air quantity deviates from a target intake-air quantity due to this response delay. As a consequence, the intermediate exhaust air-fuel ratio temporarily occurs.

An object of the present invention is therefore to improve the fuel efficiency by securing a wider range of a lean combustion operating region where the lean combustion mode is set and to suppress the occurrence of the intermediate exhaust air-fuel ratio at the change of the combustion mode to a minimum.

Here, Patent Document 1 discloses a technique that suppresses a torque shock at the change of the combustion mode between the stoichiometric combustion mode and the lean combustion mode in the hybrid vehicle by previously setting an output ratio of a motor to be high. However, the technique of the Patent Document 1 cannot solve the above problem raised by the present application.

CITATION LIST

Patent Document

Patent Document 1: Japanese Unexamined Patent Application Publication No. JP2008-068802

SUMMARY OF THE INVENTION

As a control of the hybrid vehicle according to the present invention, a stoichiometric combustion operating region where a stoichiometric combustion mode is set and a lean combustion operating region where a lean combustion mode is set are previously set with torque and rotation speed of an internal combustion engine being parameters. And, as a boundary at a high torque side between the both operating regions, a second boundary at which a change from the stoichiometric combustion mode to the lean combustion mode is executed when the torque decreases is set at a low torque side as compared with a first boundary at which a change from the lean combustion mode to the stoichiometric combustion mode is executed when the torque increases. Then, upon shift from the stoichiometric combustion operating region to the lean combustion operating region, after changing the combustion mode, for delay in change of an intake-air quantity which is associated with the combustion mode change, a quantity-decrease correction of a fuel injection quantity is performed so as to maintain the target air-fuel ratio, and also the assist by a motor is performed so as to attain a required driving force.

That is, upon shift from the stoichiometric combustion operating region to the lean combustion operating region, although the target air-fuel ratio changes from a stoichiometric air-fuel ratio to a lean air-fuel ratio and the target air-fuel ratio increases by and according to the combustion mode change, the delay in change of an actual intake-air quantity occurs. For this delay in intake-air quantity change, the quantity-decrease correction of the fuel injection quantity is performed so as to maintain the target air-fuel ratio that is a predetermined lean air-fuel ratio. With this, an occurrence of the intermediate exhaust air-fuel ratio is suppressed. Although the torque of the internal combustion engine is decreased by this quantity-decrease correction of the fuel injection quantity, by performing assist by a power running operation of the motor, it is possible to attain a required driving force of the whole vehicle.

Since the shift from the stoichiometric combustion mode to the lean combustion mode involves the assist by the motor in this manner, by setting the second boundary at which this shift should be performed at the low torque side, the shift while excluding the intermediate exhaust air-fuel ratio can be possible without requiring an excessively large torque. In contrast to this, regarding a shift from the lean combustion mode to the stoichiometric combustion mode, since a mode change that can attain the required driving force is possible, for instance, by performing ignition timing retard without depending on the motor, the shift can be set at a higher torque side without being limited by the second boundary. Therefore, the lean combustion mode can be set in a wider region, thereby improving the fuel efficiency of the internal combustion engine.

BRIEF DESCRIPTION OF DRAWINGS

FIGS. 4A to 4F are time charts showing a mode change operation in a scene 2 (an arrow S2).

EMBODIMENTS FOR CARRYING OUT THE INVENTION

Figure 1:
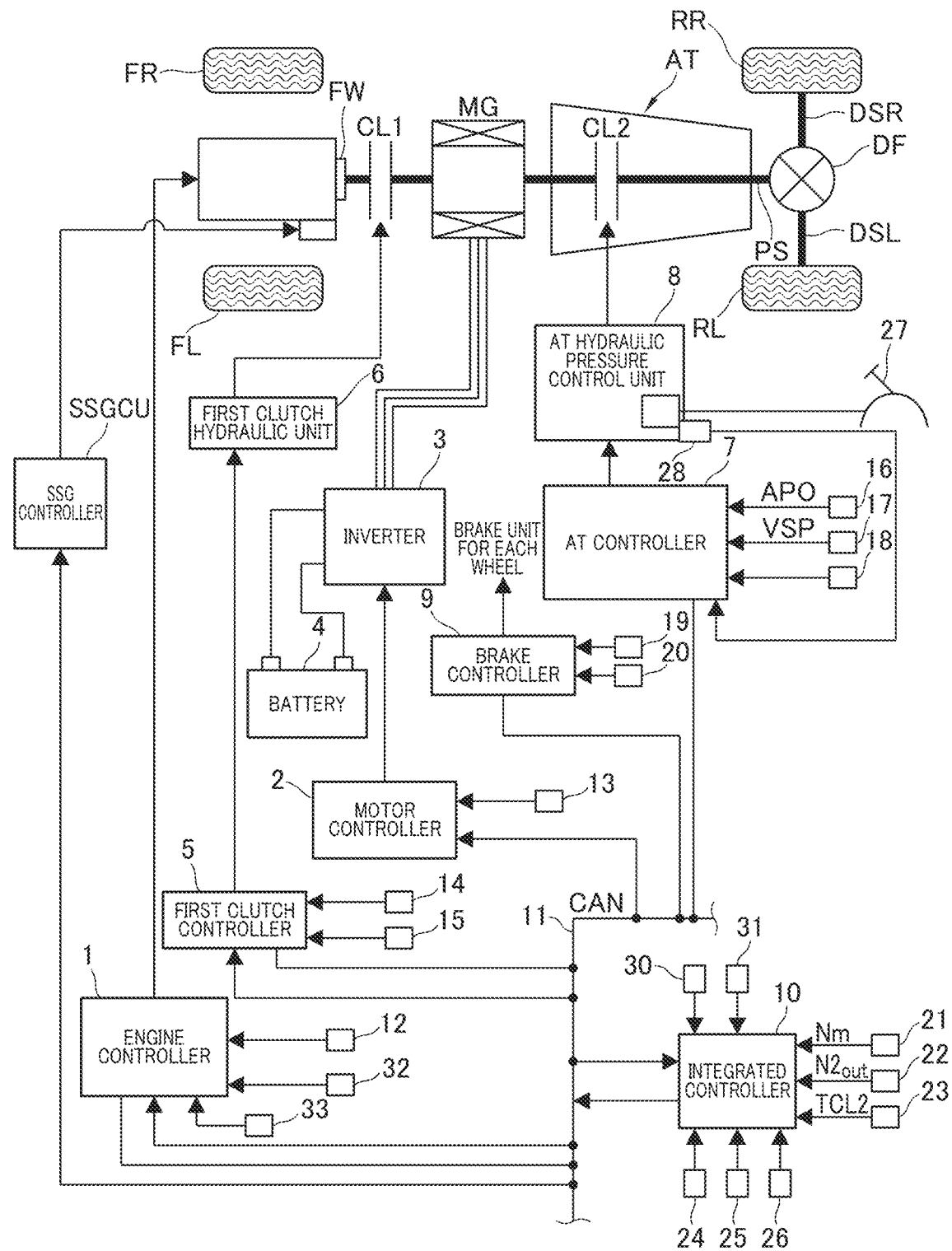
FIG. 1 is an explanatory drawing showing a system of a hybrid vehicle according to the present invention.

FIG. 1 is an explanatory drawing showing a system of a hybrid vehicle according to the present invention. The hybrid vehicle has an engine E that is an internal combustion engine and a motor/generator MG, and drives rear-right and rear-left wheels (driving wheels) RR and RL through a first clutch CL1, a second clutch CL2, an automatic transmission AT, a differential mechanism DF etc.

The engine E is, for instance, a direct-injection spark-ignition gasoline engine, and a throttle valve opening, a fuel injection quantity and an ignition timing (all not shown) etc. are controlled on the basis of a control command from an engine controller 1. This engine E is particularly configured to be able to change a combustion mode between a stoichiometric combustion mode in which a stoichiometric air-fuel ratio (i.e. an excess coefficient (or an excess air ratio) $\lambda=1$) is set as a target air-fuel ratio and a lean combustion mode in which a lean air-fuel ratio (e.g. $\lambda=2$) is set as the target air-fuel ratio. Further, the engine E is provided with an exhaust gas purifying device using a catalyst in an exhaust system (all not shown). For instance, by making a switch of a flow passage according to each combustion mode, proper exhaust purification is realized under each combustion mode (in other words, under each exhaust air-fuel ratio).

The engine E is also provided with a starter/generator SSG that is connected to a crankshaft of the engine E through a belt drive mechanism. This starter/generator SSG is controlled to perform either one of a power running operation or a regenerative operation by an SSG controller SSGCU. Upon the power running operation, the starter/generator SSG works as the starter for an engine start. Upon the regenerative operation, the starter/generator SSG generates electric power as the generator.

The first clutch CL1 is a normally-engaged dry clutch that is interposed between the engine E and the motor/generator MG. Engagement and disengagement of the first clutch CL1 are controlled by a control pressure that is produced by a first clutch hydraulic unit 6 on the basis of a control command from a first clutch controller 5. Further, slip-engagement by which torque is transmitted while the first clutch CL1 slips is possible by the above control pressure.

The motor/generator MG is a permanent magnet type three-phase AC electric motor. The motor/generator MG is controlled to perform either one of a power running operation or a regenerative operation through an inverter 3 on the basis of a control command from a motor controller 2. By performing the power running operation by receiving power from a battery 4, the motor/generator MG can assist vehicle drive by providing a vehicle driving force. Also, by performing the regenerative operation, the motor/generator MG charges the battery 4. A rotor of the motor/generator MG, using a permanent magnet, is connected to an input shaft of the automatic transmission AT through a damper (not shown).

The second clutch CL2 is a clutch that is positioned between the motor/generator MG and the rear-right and rear-left wheels RR and RL and works also as a starting clutch. The second clutch CL2 is actually configured by one or a plurality of frictional engagement elements such as a clutch and a brake provided in the automatic transmission AT. Engagement and disengagement including slip-engagement of the second clutch CL2 are controlled by a control pressure that is produced by an AT hydraulic pressure control unit 8 on the basis of a control command from an AT controller 7.

The automatic transmission AT is, for instance, a multi-range transmission (or a multi-speed transmission). A speed shift control of the automatic transmission AT is performed on the basis of a vehicle speed VSP and an accelerator opening (an accelerator pedal operating amount by a driver) APO etc. by the AT controller 7.

The hybrid vehicle has, as a control system, the engine controller 1, the motor controller 2, the inverter 3, the battery 4, the first clutch controller 5, the first clutch hydraulic unit 6, the AT controller 7, the AT hydraulic pressure control unit 8, a brake controller 9, an integrated controller 10 and the SSG controller SSGCU. The engine controller 1, the motor controller 2, the first clutch controller 5, the AT controller 7, the brake controller 9, the integrated controller 10 and the SSG controller SSGCU are connected with each other through a CAN communication line 11 that allows exchange of information between them.

The engine controller 1 controls the throttle valve opening and the fuel injection quantity etc. on the basis of a target engine torque command from the integrated controller 10 which is based on a required driving force. The engine controller 1 inputs engine rotation speed information from an engine rotation speed sensor 12, a cylinder discrimination signal from a cylinder discrimination sensor 32, intake-air quantity information from an intake-air quantity sensor 33 and so on.

The motor controller 2 inputs information from a resolver 13 that detects a rotation position of the rotor of the motor/generator MG, a target motor torque command from the integrated controller 10 and so on. The motor controller 2 outputs a command that controls a motor operating point of the motor/generator MG in accordance with the target motor torque command etc. to the inverter 3. Further, the motor controller 2 checks or watches an SOC (State Of Charge) indicating a charge state of the battery 4. SOC information is used for control of the motor/generator MG, and also is sent to the integrated controller 10.

The first clutch controller 5 inputs sensor information from a first clutch hydraulic pressure sensor 14 and a first clutch stroke sensor 15, and also inputs a first clutch control command from the integrated controller 10. The first clutch controller 5 then outputs an engagement/disengagement control command for the first clutch CL1 to the first clutch hydraulic unit 6 on the basis of these inputted information and command. Information of a first clutch stroke C1S by the first clutch stroke sensor 15 is sent to the integrated controller 10.

The AT controller 7 inputs sensor signals from sensors such as an accelerator pedal opening sensor 16, a vehicle speed sensor 17, a second clutch hydraulic pressure sensor 18 and an inhibitor switch 28 that outputs a range signal corresponding to a shift position of a selecting lever 27, and also inputs a control command from the integrated controller 10. The AT controller 7 then outputs a control command to the AT hydraulic pressure control unit 8 on the basis of these inputted signals and command. The accelerator opening APO, the vehicle speed VSP and the inhibitor switch signal are sent to the integrated controller 10.

The brake controller 9 inputs sensor information from a wheel speed sensor 19 for detecting each wheel speed of four wheels and a brake stroke sensor 20. The brake controller 9 performs a regenerative brake cooperative control on the basis of a regenerative cooperative control command from the integrated controller 10 so as to compensate for the shortage of a regenerative braking force for a required braking force determined by a brake stroke BS with a mechanical braking force (a braking force by a friction brake) upon a brake operation by driver's brake pedal depression.

The integrated controller 10 controls a consumption energy of the whole vehicle, and performs an integrated control of the engine E and the motor/generator MC etc. in order for the hybrid vehicle to travel at a high efficiency. The integrated controller 10 inputs information from a motor rotation speed sensor 21 that detects a motor rotation speed Nm, a second clutch output rotation speed sensor 22 that detects a second clutch output rotation speed N2out, a second clutch torque sensor 23 that detects a second clutch transmission torque capacity TCL2, a brake hydraulic pressure sensor 24 that detects a brake hydraulic pressure, a second clutch temperature sensor 25 that detects temperature of the second clutch CL2, a G sensor 26 that detects a back-and-forth acceleration of the vehicle, a first clutch temperature sensor 30 and an inverter temperature sensor 31, and also inputs information obtained from other controllers etc. via the CAN communication line 11.

Here, the engine controller 1 and the motor controller 2 which are functionally integrated through the integrated controller 10 correspond to a "controller" recited in claim.

Figure 2:
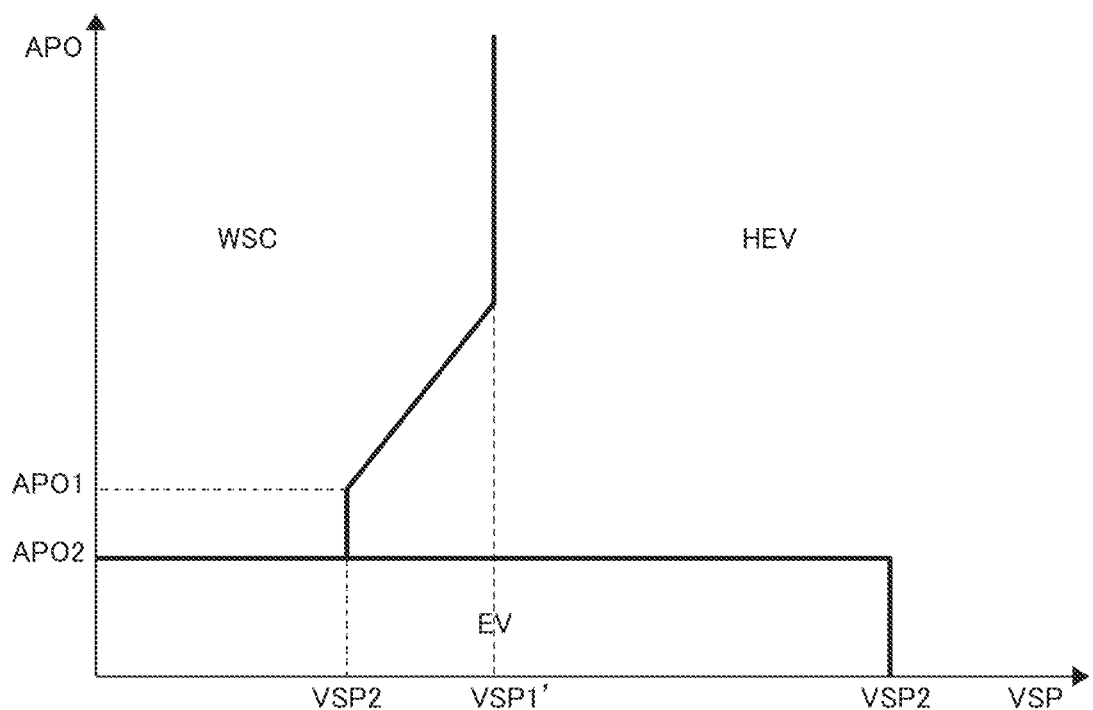
FIG. 2 is characteristics showing a plurality of drive modes of the hybrid vehicle.

As shown in FIG. 2, the hybrid vehicle has three drive modes according to the accelerator opening APO and the vehicle speed VSP. That is, the hybrid vehicle has an electric vehicle drive mode (an EV drive mode) in which the first clutch CL1 is in a disengaged state and the vehicle travels by only power of the motor/generator MG as a power source, an engine-used drive mode (an HEV drive mode) in which the first clutch CL1 is in an engaged state and the vehicle travels while including the engine E as the power source, and an engine-used slip drive mode (a WSC drive mode) in which the first clutch CL1 is in the engaged state and the second clutch CL2 is slip-controlled, then the vehicle travels while including the engine E as the power source.

Further, the HEV drive mode includes three drive modes of an engine drive mode, a motor assist drive mode and a travelling power generation mode. In the engine drive mode, the vehicle travels by only power of the engine E. In the motor assist drive mode, the vehicle travels by both powers of the engine E and the motor/generator MG. In the travelling power generation mode, the vehicle travels with the engine E being the power source and the motor/generator MG works as the generator. Upon deceleration, by receiving a regenerative brake energy, the motor/generator MG generates the power and charges the battery 4.

The hybrid vehicle further has a power generation mode in which during vehicle stop, the motor/generator MG is operated as the generator by using power of the engine E. Here, in a case where the SOC of the battery 4 is low and/or there is an idle stop forbidden demand, the mode is forcefully shifted from EV drive mode to the HEV drive mode.

Figure 3:
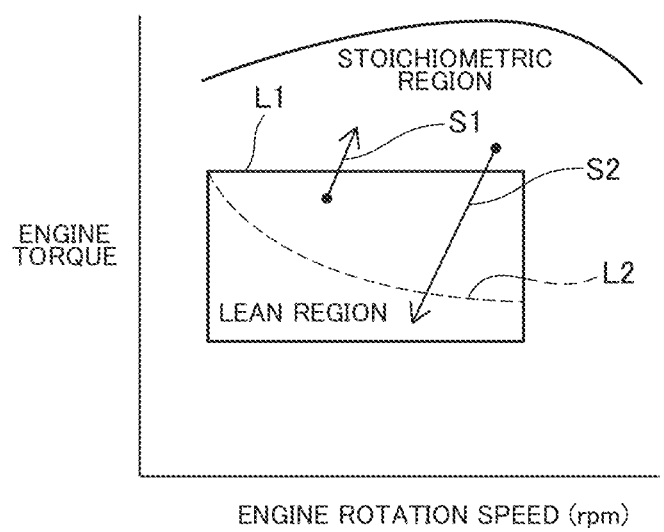
FIG. 3 is a drawing showing characteristics of a target air-fuel ratio of an engine.

FIG. 3 is a drawing showing characteristics of the target air-fuel ratio for an operating condition (the torque and the engine rotation speed) of the engine E. In the above HEV drive mode, e.g. in the engine drive mode, the engine E is operated at an operating point (a specific combination of the torque and the engine rotation speed) determined so as to attain a target engine torque on the basis of the command that the engine controller 1 receives from the integrated controller 10. As described above, the engine E is configured to be able to change the combustion mode between the stoichiometric combustion mode in which the stoichiometric air-fuel ratio ($\lambda=1$) is set as the target air-fuel ratio and the lean combustion mode in which the lean air-fuel ratio ($\lambda=2$) is set as the target air-fuel ratio. If the operating point is positioned in a lean combustion operating region illustrated as a "lean region" in FIG. 3, the lean combustion mode is selected. If the operating point is positioned in a stoichiometric combustion operating region illustrated as a "stoichiometric region" in FIG. 3, the stoichiometric combustion mode is selected. For instance, the engine controller 1 has a combustion mode change map corresponding to the characteristics of FIG. 3. The stoichiometric combustion operating region exists at both sides of a low torque side and a high torque side with respect to the lean combustion operating region, and a high rotation speed side with respect to a certain rotation speed is also the stoichiometric combustion operating region.

Here, as a boundary at a high torque side between the lean combustion operating region and the stoichiometric combustion operating region, it is a first boundary L1 at which a change from the lean combustion mode to the stoichiometric combustion mode is executed when the torque of the engine E increases and a second boundary L2 at which a change from the stoichiometric combustion mode to the lean combustion mode is executed when the torque of the engine E decreases. The second boundary L2 is set at a low torque side as compared with the first boundary L1. In otherwords, the second boundary L2 at the torque decrease has a hysteresis at the low torque side with respect to the first boundary L1 at the torque increase.

Therefore, in a case where the torque increases during the engine operation in the lean combustion mode in the lean combustion operating region, when the operating point crosses the first boundary L1, a mode change operation to the stoichiometric combustion mode is executed (see an arrow S1 in FIG. 3). Conversely, in a case where the torque decreases during the engine operation in the stoichiometric combustion mode in the stoichiometric combustion operating region at the high torque side, even if the operating point is shifted to a low torque side with respect to the first boundary L1, the stoichiometric combustion mode continues, but when the operating point crosses the second boundary L2, a mode change operation to the lean combustion mode is executed (see an arrow S2 in FIG. 3). Then, once the combustion mode is changed to the lean combustion mode by the operating point crossing the second boundary L2, even if the torque increases, the lean combustion mode is maintained until the operating point crosses the first boundary L1.

In other words, as compared with the lean combustion operating region determined by the second boundary L2 for a torque decrease direction, regarding a torque increase direction, since the first boundary L1 is set at the high torque side, the lean combustion operating region is substantially wide.

Here, the first boundary L1 is set along a limit of a torque by which when increasing the fuel injection quantity according to the torque increase, a lean combustion with the target air-fuel ratio set to the lean air-fuel ratio (e.g. $\lambda=2$) can be established (along a torque by which when increasing the fuel injection quantity according to the torque increase, a limit of establishment of a lean combustion with the target air-fuel ratio set to the lean air-fuel ratio (e.g. $\lambda=2$) is determined). The second boundary L2 is set along a performance limit of the motor/generator MG that performs the assist of the driving force at the mode change operation as described later.

FIGS. 4A to 4F show time charts of the combustion mode change operation upon shift of the region (in a scene 2)

shown by the arrow S2 in FIG. 3. This scene 2 corresponds to a situation, for instance, as shown in FIG. 4A, where from an operating state with such a relatively large accelerator opening that the vehicle speed increases, the accelerator opening is decreased stepwise at time t1 in order for the vehicle speed to be constant. At time t1, the operating point changes as shown by the arrow S2 in FIG. 3, and crosses the second boundary L2.

By and according to this shift of the operating point, as shown in FIG. 4C, the combustion mode is changed from the stoichiometric combustion mode ($\lambda=1$) to the lean combustion mode ($\lambda=2$), and the target air-fuel ratio becomes an air-fuel ratio corresponding to "$\lambda=2$". Since a required intake-air quantity (a required quantity of fresh air) is increased by this change of the target air-fuel ratio, a target intake-air quantity changes stepwise, and the opening (an opening degree) of the throttle valve is promptly increased. However, as shown in FIG. 4B, in actual fact, delay in a change of the quantity of the intake air that flows into the cylinder occurs. For instance, the intake-air quantity reaches the target intake-air quantity corresponding to "$\lambda=2$" at time t2. Therefore, an actual intake-air quantity is insufficient for the target intake-air quantity corresponding to "$\lambda=2$" between time t1 and time t2.

In response to such shortage of the intake-air quantity, as shown in FIG. 4D, a quantity-decrease correction of the fuel injection quantity is carried out. More specifically, for the delay in the change of the intake-air quantity as shown in FIG. 4B, the fuel injection quantity is decreased so as to maintain the target air-fuel ratio ($\lambda=2$). With this correction, the exhaust air-fuel ratio of the exhaust that undergoes purification by a catalytic device is changed stepwise from an exhaust air-fuel ratio corresponding to "$\lambda=1$" to an exhaust air-fuel ratio corresponding to "$\lambda=2$" at time t1, then an occurrence of an intermediate exhaust air-fuel ratio is suppressed. Here, strictly speaking, although the fuel injection quantity required for the same torque is slightly different between the stoichiometric combustion mode and the lean combustion mode, from the viewpoint of the purification of the exhaust, the quantity-decrease correction is carried out so that the exhaust air-fuel ratio becomes a constant value corresponding to "$\lambda=2$". Since the intake-air quantity gradually approaches the target intake-air quantity from time t1 toward time t2, the quantity-decrease correction of the fuel injection quantity is gradually reduced or lessened.

As a result of the above quantity-decrease correction of the fuel injection quantity, as shown in FIG. 4E, torque that the engine E actually produces is smaller than the target engine torque. For this torque reduction, as shown in FIG. 4F, the assist by the motor/generator MG is performed on the basis of the command provided to the motor controller 2 from the integrated controller 10 so that a total of the driving force of the engine E and the driving force of the motor/generator MG becomes (meets or attains) a required driving force of the whole vehicle. Hence, the operation along the required driving force becomes possible while avoiding the exhaust air-fuel ratio being an intermediate value at the mode change.

Next, FIGS. 5A to 5F show time charts of the combustion mode change operation when the state of charge of the battery 4 is a predetermined level or lower (e.g. the SOC is a predetermined value or lower) upon shift of the region (in the scene 2) shown by the same arrow S2 in FIG. 3.

In this case, at time t1, the target intake-air quantity is changed so as to correspond to the lean air-fuel ratio ($\lambda=2$) in advance of an actual combustion mode change. Although the opening degree of the throttle valve is increased for this change, in the same manner as the above example, an actual intake-air quantity changes with the delay, and reaches the target intake-air quantity at time t2 (see FIG. 5B).

Figure 5A:
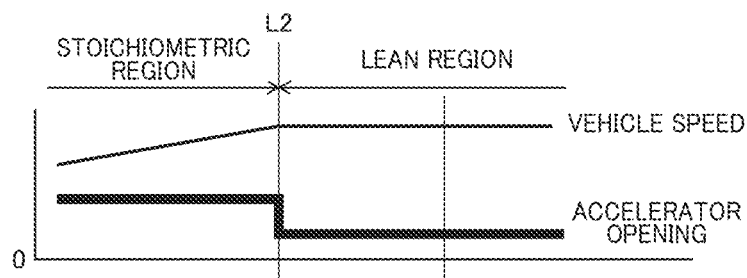
FIGS. 5A to 5F are time charts showing a mode change operation in the scene 2 when a battery SOC is low.
Figure 5B:
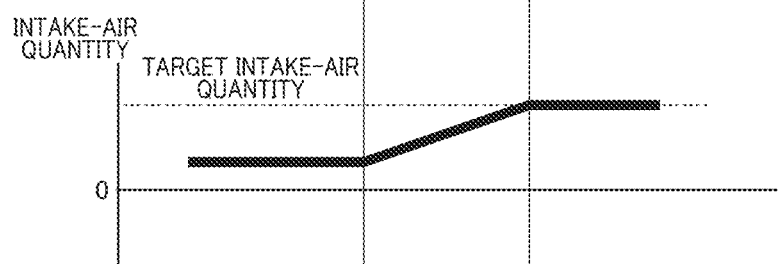
Figure 5C:

As shown in FIG. 5C, the actual combustion mode change is not carried out at time t1, but carried out from the stoichiometric combustion mode to the lean combustion mode when the intake-air quantity reaches the target intake-air quantity at time t2. Therefore, the actual intake-air quantity is surplus to the intake-air quantity corresponding to "$\lambda=1$" between time t1 and time t2.

Figure 5D:
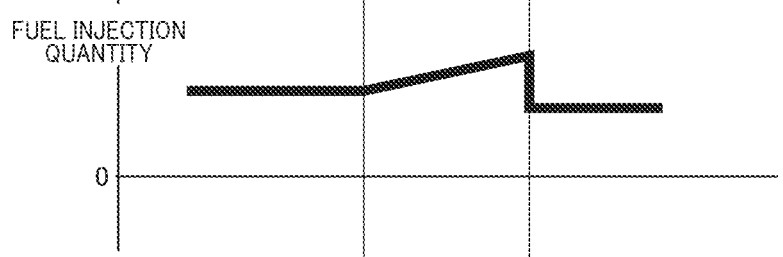

In response to such surplus of the intake-air quantity, in this example, as shown in FIG. 5D, a quantity-increase correction of the fuel injection quantity is carried out between time t1 and time t2 so as to maintain the stoichiometric air-fuel ratio ($\lambda=1$) as it stands as the target air-fuel ratio. Since the intake-air quantity gradually approaches the target intake-air quantity, a quantity-increase correction amount is gradually reduced. Then, when the intake-air quantity reaches the target intake-air quantity at time t2, the quantity-increase correction is ended, and the fuel injection quantity corresponding to the lean air-fuel ratio ($\lambda=2$) is set.

Consequently, the exhaust air-fuel ratio is maintained at an exhaust air-fuel ratio corresponding to "$\lambda=1$" between time t1 and time t2, and changes stepwise to an exhaust air-fuel ratio corresponding to "$\lambda=2$" at time t2. An occurrence of the intermediate exhaust air-fuel ratio is therefore suppressed.

Figure 5E:
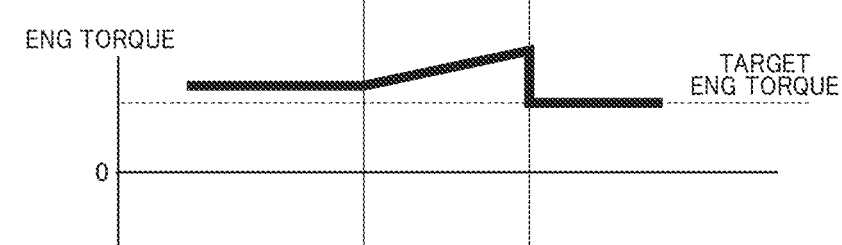
Figure 5F:
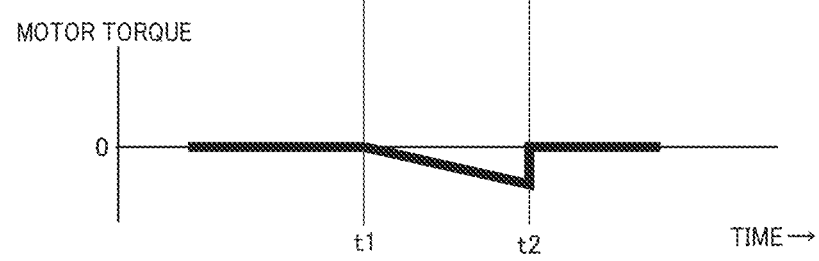

On the other hand, as shown in FIG. 5E, by and according to the above quantity-increase correction, the driving force of the engine E is surplus to requirements between time t1 and time t2. For this surplus driving force of the engine E, as shown in FIG. 5F, the regenerative operation (i.e. power absorption) by the motor/generator MG is performed so that a total of the driving force of the engine E and the driving force of the motor/generator MG conforms to a required driving force of the whole vehicle.

Figure 6A:
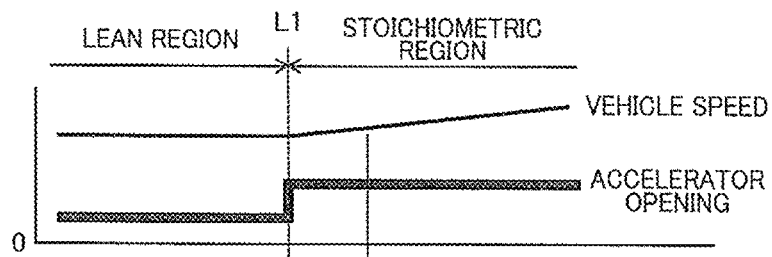
FIGS. 6A to 6F are time charts showing a mode change operation in a scene 1 (an arrow S1).

Next, FIGS. 6A to 6F show time charts of the combustion mode change operation upon shift of the region (in a scene 1) shown by the arrow S1 in FIG. 3. This scene 1 corresponds to a situation, for instance, as shown in FIG. 6A, where from an operating state with such a relatively small accelerator opening that the vehicle speed is held constant, the accelerator opening is increased stepwise at time t1 in order for the vehicle to be accelerated. At time t1, the operating point changes as shown by the arrow S1 in FIG. 3, and crosses the first boundary L1.

Figure 6B:
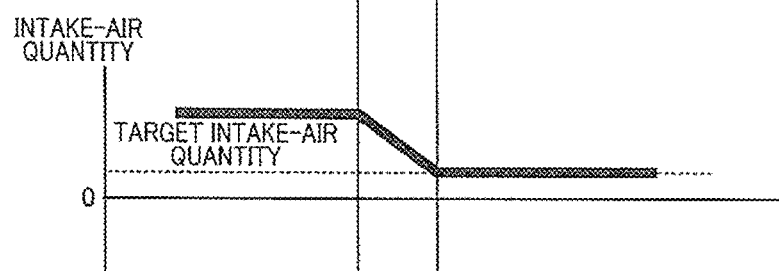
Figure 6C:
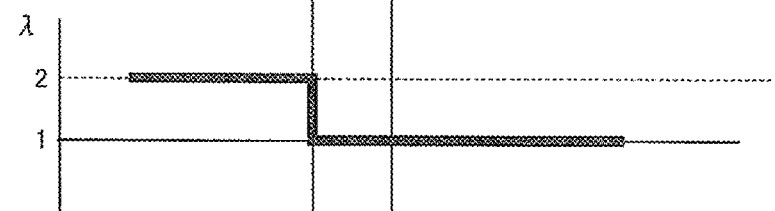

By and according to this shift of the operating point, as shown in FIG. 6C, the combustion mode is changed from the lean combustion mode ($\lambda=2$) to the stoichiometric combustion mode ($\lambda=1$), and the target air-fuel ratio becomes an air-fuel ratio corresponding to "$\lambda=1$". Since a required intake-air quantity (a required quantity of fresh air) is decreased by this change of the target air-fuel ratio, a target intake-air quantity changes stepwise, and the opening degree of the throttle valve is promptly decreased. However, as shown in FIG. 6B, in actual fact, delay in a change of the quantity of the intake air that flows into the cylinder occurs. For instance, the intake-air quantity reaches the target intake-air quantity corresponding to "$\lambda=1$" at time t2. Therefore, an actual intake-air quantity is surplus to the target intake-air quantity corresponding to "$\lambda=1$" between time t1 and time t2.

Figure 6D:
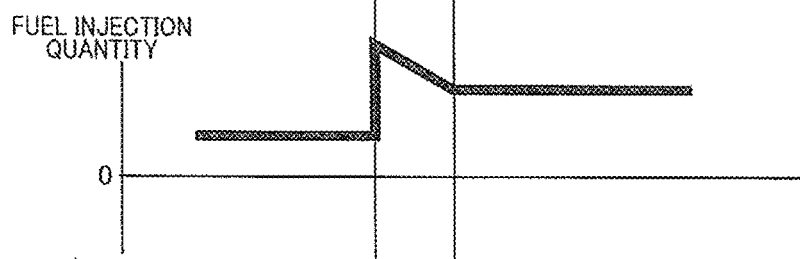

In response to such surplus of the intake-air quantity, as shown in FIG. 6D, a quantity-increase correction of the fuel injection quantity is carried out. More specifically, for the delay in the change of the intake-air quantity as shown in FIG. 6B, the fuel injection quantity is increased so as to maintain the target air-fuel ratio ($\lambda=1$). With this correction, the exhaust air-fuel ratio of the exhaust that undergoes purification by the catalytic device is changed stepwise from an exhaust air-fuel ratio corresponding to "$\lambda=2$" to an exhaust air-fuel ratio corresponding to "$\lambda=1$" at time t1, then an occurrence of the intermediate exhaust air-fuel ratio is suppressed. Here, strictly speaking, although the fuel injection quantity required for the same torque is slightly different between the lean combustion mode and the stoichiometric combustion mode, from the viewpoint of the purification of the exhaust, the quantity-increase correction is carried out so that the exhaust air-fuel ratio becomes a constant value corresponding to "$\lambda=1$". Since the intake-air quantity gradually approaches the target intake-air quantity from time t1 toward time t2, the quantity-increase correction of the fuel injection quantity is gradually reduced or lessened.

Figure 6E:
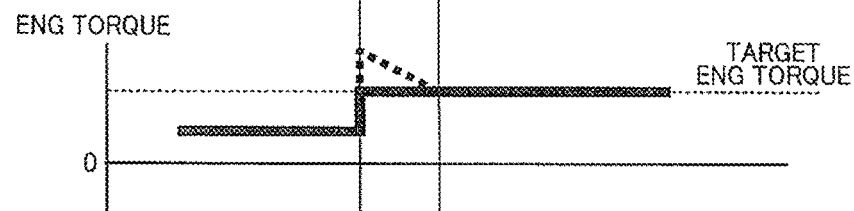
Figure 6F:
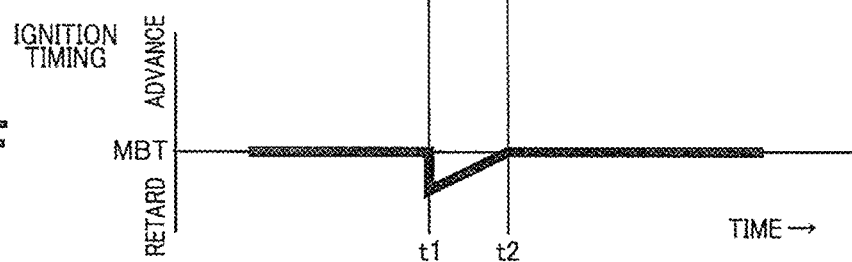

As a result of the above quantity-increase correction of the fuel injection quantity, as shown by a broken line in FIG. 6E, torque that the engine E produces could temporally become greater than the target engine torque. For this temporal torque increase, as shown in FIG. 6F, in order to suppress the torque, an ignition timing is retarded. That is, the ignition timing is corrected to a retarded side with respect to an MBT point With this ignition timing retard, as shown by a solid line in FIG. 6E, torque that the engine E actually produces conforms to the target engine torque. Hence, the operation along the required driving force becomes possible while avoiding the exhaust air-fuel ratio being an intermediate value at the mode change.

As described above, since the mode change from the stoichiometric combustion mode to the lean combustion mode at the second boundary L2 like the scene 2 involves the assist (or the regenerative operation) by the motor/generator MG, the second boundary L2 is set along the performance limit (i.e. a maximum output) of the motor/generator MG. Therefore, the second boundary L2 is positioned at a relatively low torque side. Here, if some torque step at the combustion mode change is acceptable, the second boundary L2 could be set at a slightly higher torque side than characteristics corresponding to the maximum output of the motor/generator MG.

As compared with the setting of the second boundary L2, the first boundary L1 at which the combustion mode is changed from the lean combustion mode to the stoichiometric combustion mode, which does not require the assist of the motor/generator MG, is set at the higher torque side. That is, the lean combustion operating region which has the advantage of being good fuel efficiency is secured wide.

Figure 7:
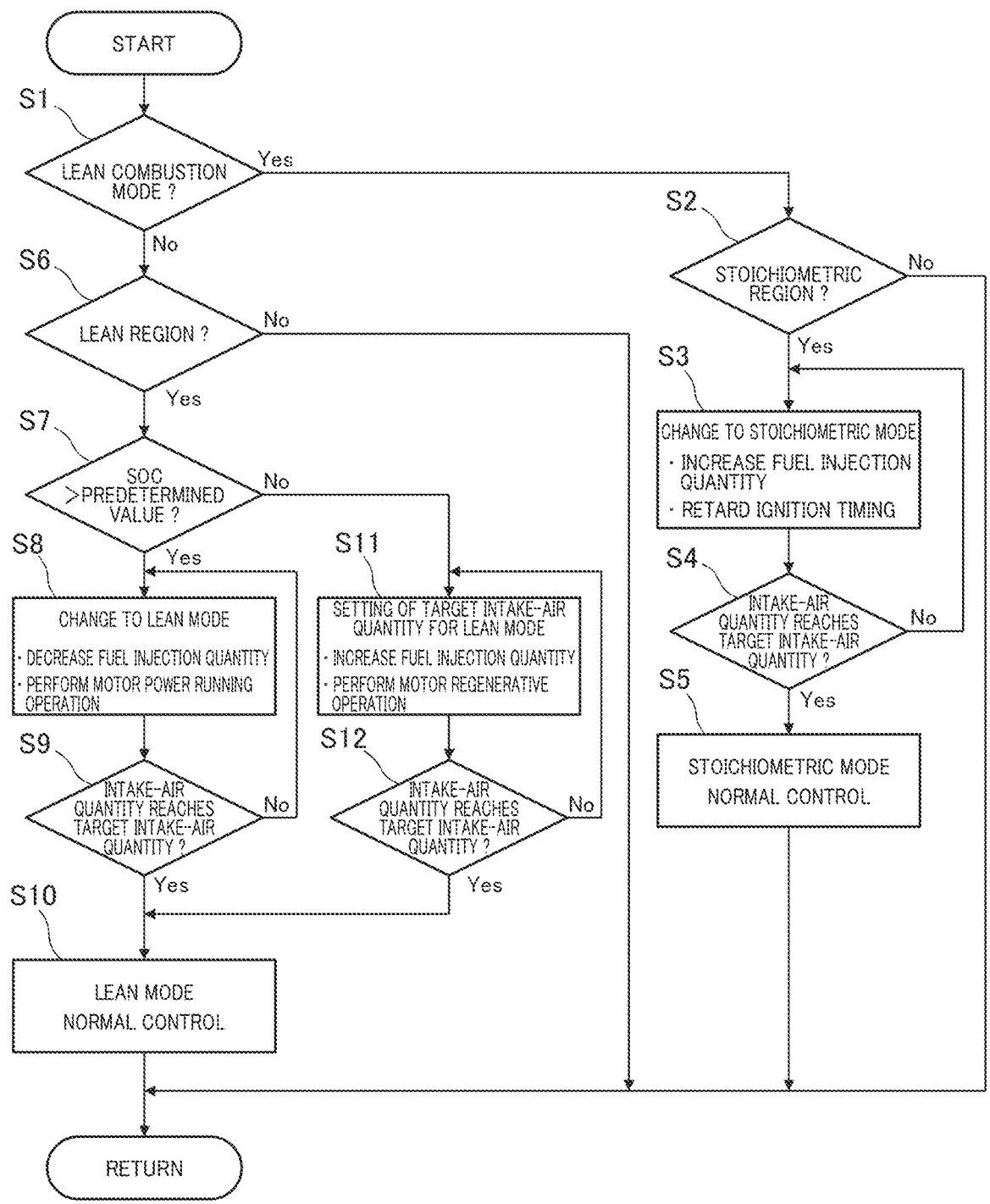
FIG. 7 is a flow chart showing a flow of the mode change operation in an embodiment.

FIG. 7 is a flow chart showing a flow of the control of the combustion mode change executed by the engine controller 1 and the motor controller 2. At step S1, a judgment is made as to whether or not a current combustion mode is the lean combustion mode, in other words, whether or not an immediately preceding operating point of the engine E is in the lean combustion operating region.

If YES at step S1, i.e. if the current combustion mode is the lean combustion mode, the routine proceeds to step S2, and a judgment is made as to whether or not the operating point is shifted to the stoichiometric combustion operating region. If NO at step S2, the lean combustion mode continues. If YES at step S2, i.e. if the operating point crosses the first boundary L1 from the lean combustion operating region and is shifted to the stoichiometric combustion operating region (see the arrow S1 in FIG. 3), the routine proceeds to step S3 from step S2, and the mode change operation from the lean combustion mode to the stoichiometric combustion mode, which is shown in FIGS. 6A to 6F, is carried out. That is, as described above, the combustion mode is immediately changed to the stoichiometric combustion mode, and by performing the quantity-increase correction of the fuel injection quantity and the ignition timing retard, the exhaust air-fuel ratio is changed stepwise to the exhaust air-fuel ratio corresponding to "$\lambda=1$".

At step S4, a judgment is made as to whether or not the intake-air quantity reaches the target intake-air quantity. If the intake-air quantity reaches the target intake-air quantity, the routine proceeds to step S5, and the control is shifted to a normal control by the stoichiometric combustion mode.

If NO at step S1, i.e. if the current combustion mode is the stoichiometric combustion mode, the routine proceeds to step S6 from step S1, and a judgment is made as to whether or not the operating point is shifted to the lean combustion operating region. If NO at step S6, the stoichiometric combustion mode continues. If YES at step S6, i.e. if the operating point crosses the second boundary L2 from the stoichiometric combustion operating region and is shifted to the lean combustion operating region (see the arrow S2 in FIG. 3), the routine proceeds to step S7 from step S6, and a judgment is made as to whether or not the SOC of the battery 4 is greater than the predetermined value. If the SOC of the battery 4 is greater than the predetermined value, the routine proceeds to step S8 from step S7, and the mode change operation from the stoichiometric combustion mode to the lean combustion mode, which is shown in FIGS. 4A to 4F, is carried out. That is, as described above, the combustion mode is immediately changed to the lean combustion mode, and by performing the quantity-decrease correction of the fuel injection quantity and the torque assist by the power running operation of the motor/generator MG, the exhaust air-fuel ratio is changed stepwise to the exhaust air-fuel ratio corresponding to "$\lambda=2$".

At step S9, a judgment is made as to whether or not the intake-air quantity reaches the target intake-air quantity. If the intake-air quantity reaches the target intake-air quantity, the routine proceeds to step S10, and the control is shifted to a normal control by the lean combustion mode.

If the SOC of the battery 4 is equal to or less then the predetermined value at step S7, the routine proceeds to step S11 from step S7, and the mode change operation from the stoichiometric combustion mode to the lean combustion mode, which is shown in FIGS. 5A to 5F, is carried out. That is, as described above, the target intake-air quantity is immediately changed, and by performing the quantity-increase correction of the fuel injection quantity and the torque absorption by the regenerative operation of the motor/generator MG, the stoichiometric combustion mode corresponding to "$\lambda=1$" continues. Then, at step S12, a judgment is made as to whether or not the intake-air quantity reaches the target intake-air quantity. If the intake-air quantity reaches the target intake-air quantity, the routine proceeds to step S10, and the control is shifted to the normal control by the lean combustion mode. That is, in this case, as described above, the actual combustion mode is changed to the lean combustion mode at a time when the intake-air quantity reaches the target intake-air quantity.

Although one embodiment of the present invention has been explained in detail, the present invention is not limited to the embodiment described above, but includes a various modifications. For instance, the above embodiment shows the example in which the air-fuel ratio of the lean combustion mode is an air-fuel ratio corresponding to "$\lambda=2$". However, the present invention is not limited to this, but can use proper lean air-fuel ratios. Further, in the above embodiment, when the SOC of the battery 4 is low, the mode change operation using the regenerative operation of the motor/generator MG, which is shown in FIGS. 5A to 5F, is carried out. However, besides the condition of the SOC of the battery 4, in a case where the torque assist by the motor/generator MG is difficult, the mode change operation like FIGS. 5A to 5F could be carried out. In addition, the mode change from the stoichiometric combustion mode to the lean combustion mode might not be performed when the SOC of the battery 4 is low.

Further, the present invention can be applied to a so-called mild hybrid type hybrid vehicle that has no large-sized motor/generator MG for running and performs the torque assist by the starter/generator SSG.

The invention claimed is:

1. A method for controlling a hybrid vehicle, the hybrid vehicle having an internal combustion engine that is capable of changing a combustion mode between a stoichiometric combustion mode in which a stoichiometric air-fuel ratio is set as a target air-fuel ratio and a lean combustion mode in which a lean air-fuel ratio is set as the target air-fuel ratio and a motor that is capable of performing assist of power of the internal combustion engine by a power running operation, the method comprising:

previously setting a stoichiometric combustion operating region where the stoichiometric combustion mode is set and a lean combustion operating region where the lean combustion mode is set with torque and rotation speed of the internal combustion engine being parameters;

as a boundary at a high torque side between the both operating regions, setting a second boundary at which a change from the stoichiometric combustion mode to the lean combustion mode is executed when the torque decreases at a low torque side as compared with a first boundary at which a change from the lean combustion mode to the stoichiometric combustion mode is executed when the torque increases;

upon shift from the stoichiometric combustion operating region to the lean combustion operating region by crossing the second boundary, after changing the combustion mode, for delay in change of an intake-air quantity which is associated with the combustion mode change, performing a quantity-decrease correction of a fuel injection quantity so as to maintain the target air-fuel ratio at the lean air-fuel ratio, and performing the assist by the motor so as to attain a required driving force; and setting the second boundary so that the assist can be performed within a range of a maximum output of the motor.

2. The method for controlling the hybrid vehicle as claimed in claim 1, wherein:

as the motor, a motor that is capable of performing the assist of the power of the internal combustion engine by the power running operation and also performing absorption of the power of the internal combustion engine by a regenerative operation is used, and the method further comprising:

upon shift from the stoichiometric combustion operating region to the lean combustion operating region, under specific conditions, after changing a target intake-air quantity so as to correspond to the lean air-fuel ratio in advance of the combustion mode change, performing a quantity-increase correction of the fuel injection quantity so as to maintain the stoichiometric air-fuel ratio as the target air-fuel ratio for a time period of the delay of the intake-air quantity change, and performing the regenerative operation of the motor so as to attain the required driving force.

3. The method for controlling the hybrid vehicle as claimed in claim 2, wherein:

one of the specific conditions is that a state of charge of a battery that is a power source for the motor is a predetermined level or lower.

4. A control device of a hybrid vehicle comprising:

an internal combustion engine that is capable of changing a combustion mode between a stoichiometric combustion mode in which a stoichiometric air-fuel ratio is set as a target air-fuel ratio and a lean combustion mode in which a lean air-fuel ratio is set as the target air-fuel ratio;

a motor that is capable of performing assist of power of the internal combustion engine by a power running operation; and a controller that controls the internal combustion engine and the motor, and wherein the controller has a combustion mode change map in which a stoichiometric combustion operating region where the stoichiometric combustion mode is set and a lean combustion operating region where the lean combustion mode is set are previously set with torque and rotation speed of the internal combustion engine being parameters, a boundary at a high torque side between the both operating regions in the combustion mode change map has a first boundary at which a change from the lean combustion mode to the stoichiometric combustion mode is executed when the torque increases and a second boundary which is set at a low torque side with respect to the first boundary and at which a change from the stoichiometric combustion mode to the lean combustion mode is executed when the torque decreases, and the controller is configured to, upon shift from the stoichiometric combustion operating region to the lean combustion operating region by crossing the second boundary, after changing the combustion mode, for delay in change of an intake-air quantity which is associated with the combustion mode change, perform a quantity-decrease correction of a fuel injection quantity so as to maintain the target air-fuel ratio at the lean air-fuel ratio, and perform the assist by the motor so as to attain a required driving force, and set the second boundary so that the assist can be performed within a range of a maximum output of the motor.

* * * * *